United States Patent
Kumar

(10) Patent No.: US 9,348,709 B2
(45) Date of Patent: May 24, 2016

(54) MANAGING NODES IN A DISTRIBUTED COMPUTING ENVIRONMENT

(71) Applicant: Dinesh Kumar, Pune (IN)

(72) Inventor: Dinesh Kumar, Pune (IN)

(73) Assignee: SYBASE, INC., Dublin, CA (US)

( * ) Notice: Subject to any disclaimer, the term of this patent is extended or adjusted under 35 U.S.C. 154(b) by 196 days.

(21) Appl. No.: 14/141,512

(22) Filed: Dec. 27, 2013

(65) Prior Publication Data

US 2015/0186228 A1    Jul. 2, 2015

(51) Int. Cl.
*G06F 11/00* (2006.01)
*G06F 11/20* (2006.01)

(52) U.S. Cl.
CPC .................... *G06F 11/2028* (2013.01)

(58) Field of Classification Search
USPC ......................................................... 714/4.11
See application file for complete search history.

(56) References Cited

U.S. PATENT DOCUMENTS

| | | | | |
|---|---|---|---|---|
| 2002/0178395 A1* | 11/2002 | Chen | ..................... | H04M 15/00 714/2 |
| 2003/0158933 A1* | 8/2003 | Smith | ....................... | H04L 1/22 709/224 |
| 2007/0239888 A1* | 10/2007 | Croxford | .............. | G06F 13/372 709/236 |
| 2012/0017121 A1* | 1/2012 | Carlson | ............... | H04L 41/0654 714/43 |
| 2013/0058227 A1* | 3/2013 | Lemieux | ............... | G06F 9/5077 370/252 |
| 2014/0372549 A1* | 12/2014 | Li-On | ................. | H04L 67/1004 709/213 |

* cited by examiner

*Primary Examiner* — Sarai Butler

(57) ABSTRACT

Various embodiments of systems and methods for managing a plurality of nodes in a distributed computing environment are described herein. Initially a request to process a to-be-processed request is received. Next one or more nodes from a plurality of nodes, included in a cluster, is identified to process the to-be-processed request. Next the to-be-processed request is divided into a plurality of sub-requests. Next the plurality of sub-requests are assigned to the identified one or more nodes and the generated additional node. A node failure of one of the one or more identified nodes is identified. Finally, one or more of the plurality of sub-requests assigned to the failed node is re-assigned to another node of the plurality of nodes.

20 Claims, 11 Drawing Sheets

MANAGING NODES IN A DISTRIBUTED COMPUTING ENVIRONMENT

BACKGROUND

Cloud computing providers deliver computing infrastructures as a fully outsourced service, enabling companies to reduce capital expenditure on hardware, software and support services by paying a provider only for what they use. Cloud computing services may be offered at various layers of the software stack. At lower layers, Infrastructure as a Service (IaaS) systems allow users to have access to virtual machines (VMs) hosted by the provider, and the users are responsible for providing the entire software stack running inside a VM. At higher layers, Software as a Service (SaaS) systems offer online applications that can be directly executed by the users. With the increase of clients in cloud based computing, the load on various VM nodes providing the cloud computing services may increase manifold.

BRIEF DESCRIPTION OF THE DRAWINGS

The claims set forth the embodiments of the invention with particularity. The invention is illustrated by way of example and not by way of limitation in the figures of the accompanying drawings in which like references indicate similar elements. The embodiments of the invention, together with its advantages, may be best understood from the following detailed description taken in conjunction with the accompanying drawings.

DETAILED DESCRIPTION

Embodiments of techniques for managing nodes in a distributed computing environment are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment", "this embodiment" and similar phrases, means that a particular feature, structure, or characteristic described in connection with the embodiment is included in at least one embodiment. Thus, the appearances of these phrases in various places throughout this specification are not necessarily all referring to the same embodiment. Furthermore, the particular features, structures, or characteristics may be combined in any suitable manner in one or more embodiments.

Figure 1:
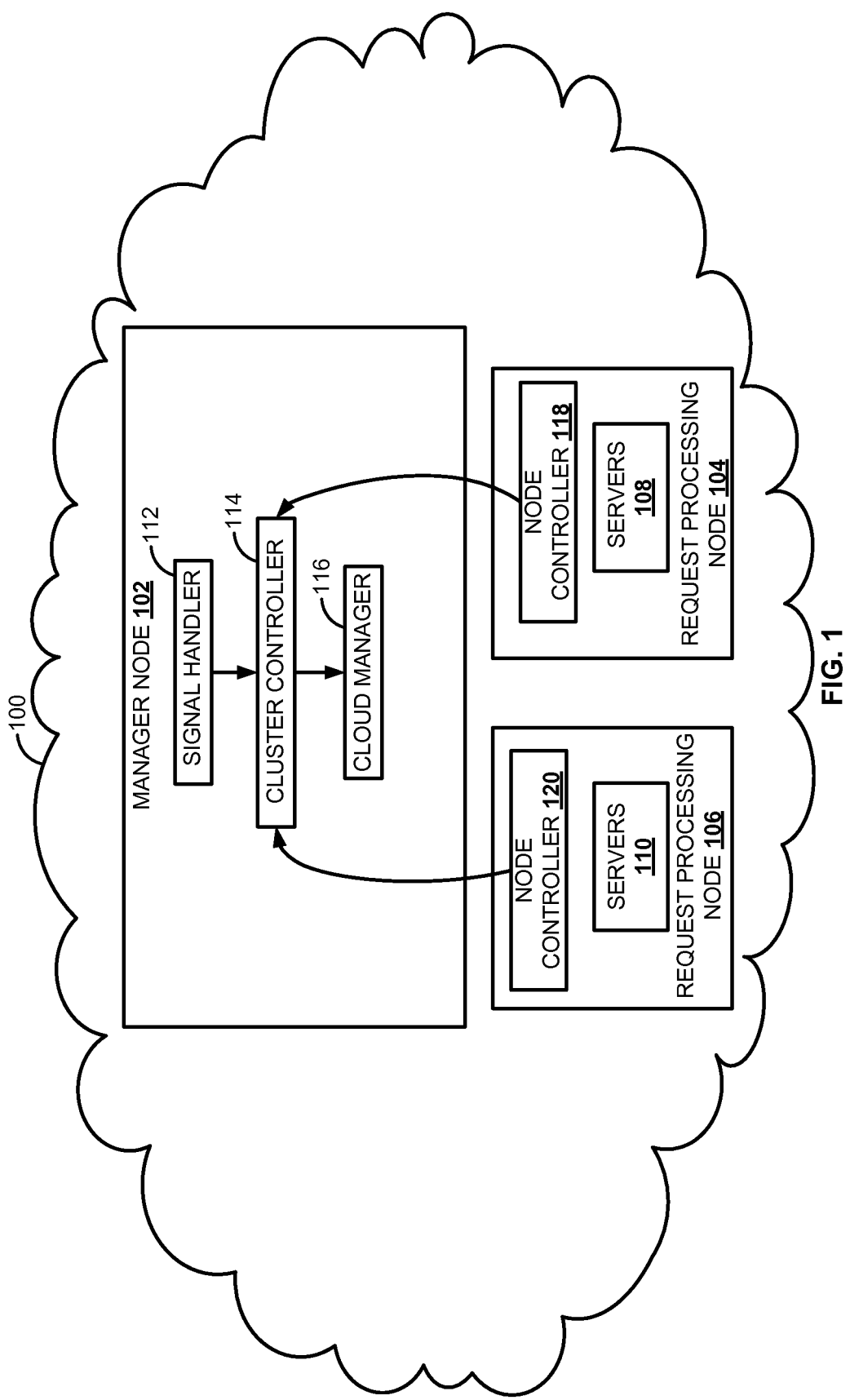
FIG. 1 is a block diagram illustrating a cluster in a distributed computing environment, according to an embodiment.
Figure 2A:
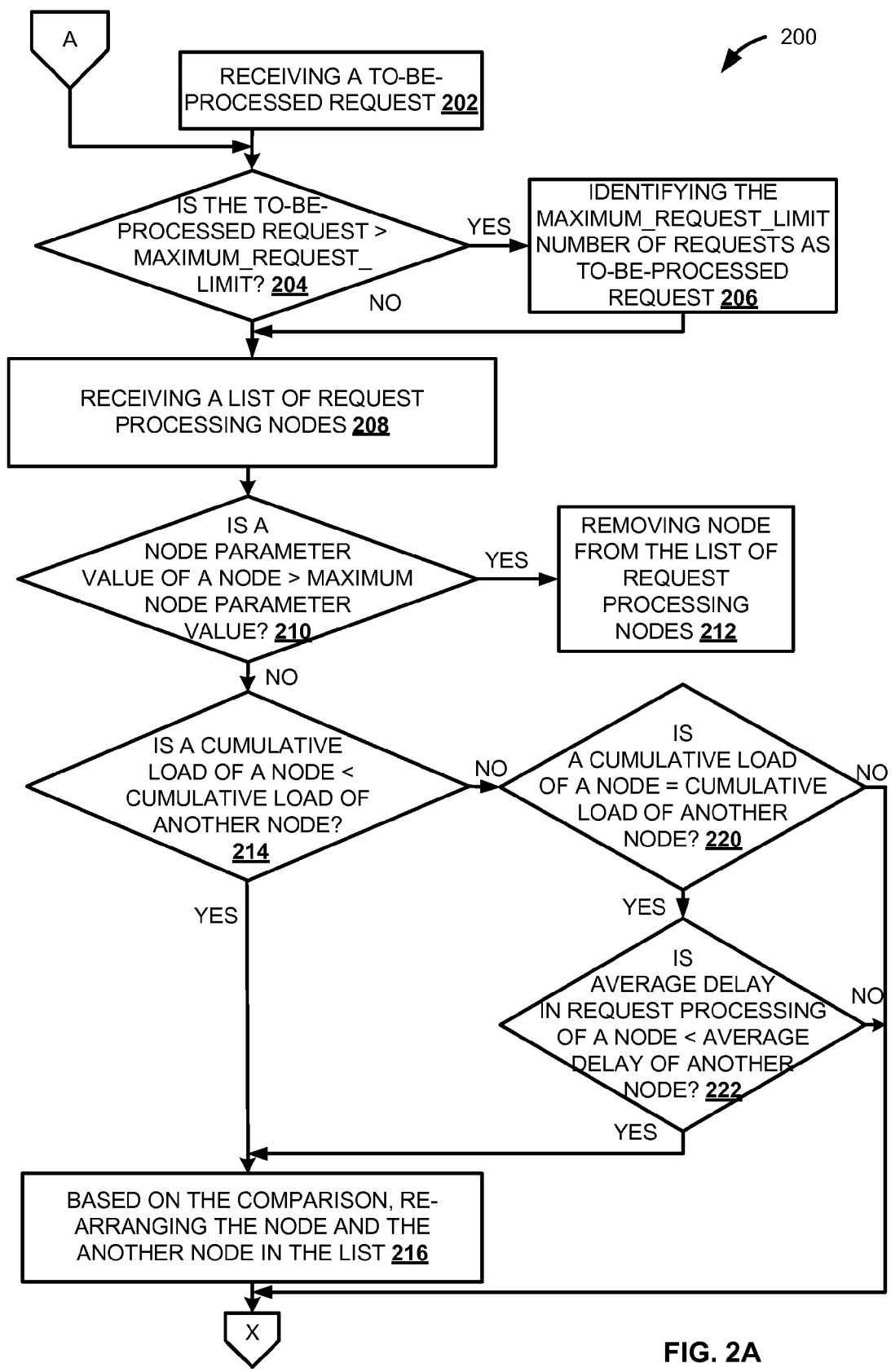
FIGS. 2A-2E is a flow diagram illustrating a process for managing nodes in a distributed computing environment, according to an embodiment.
Figure 2B:
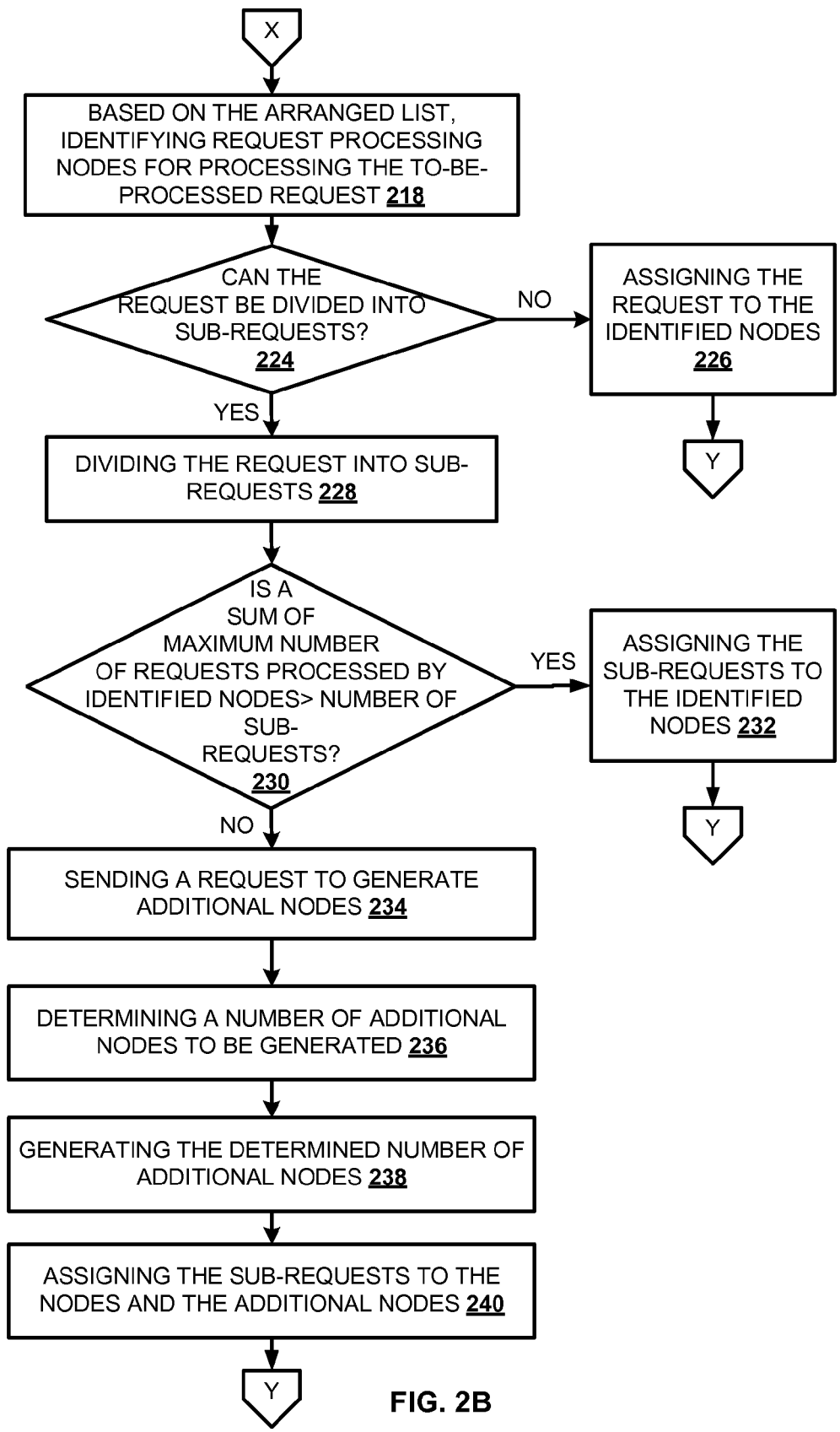
Figure 2C:
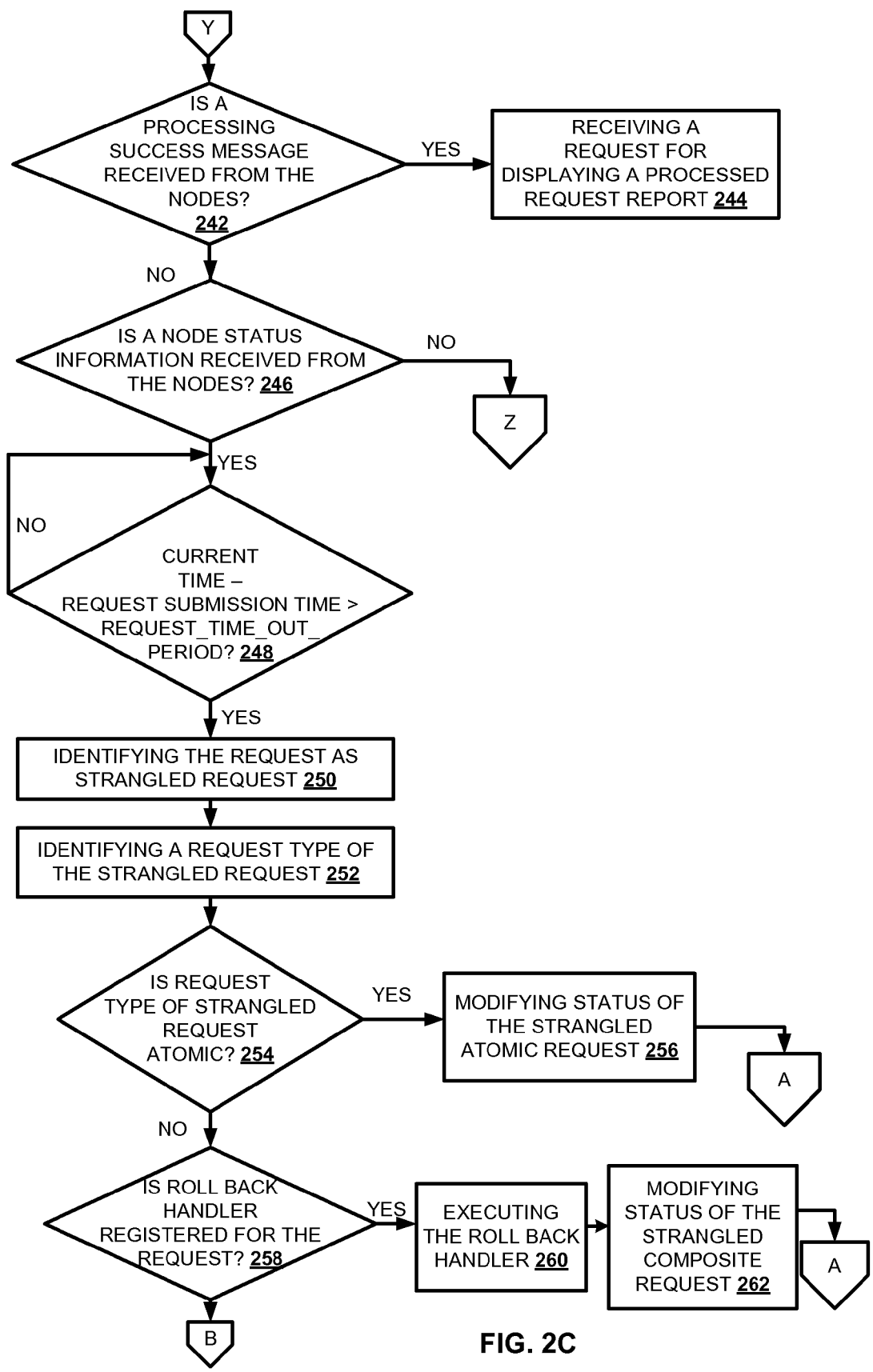
Figure 2D:
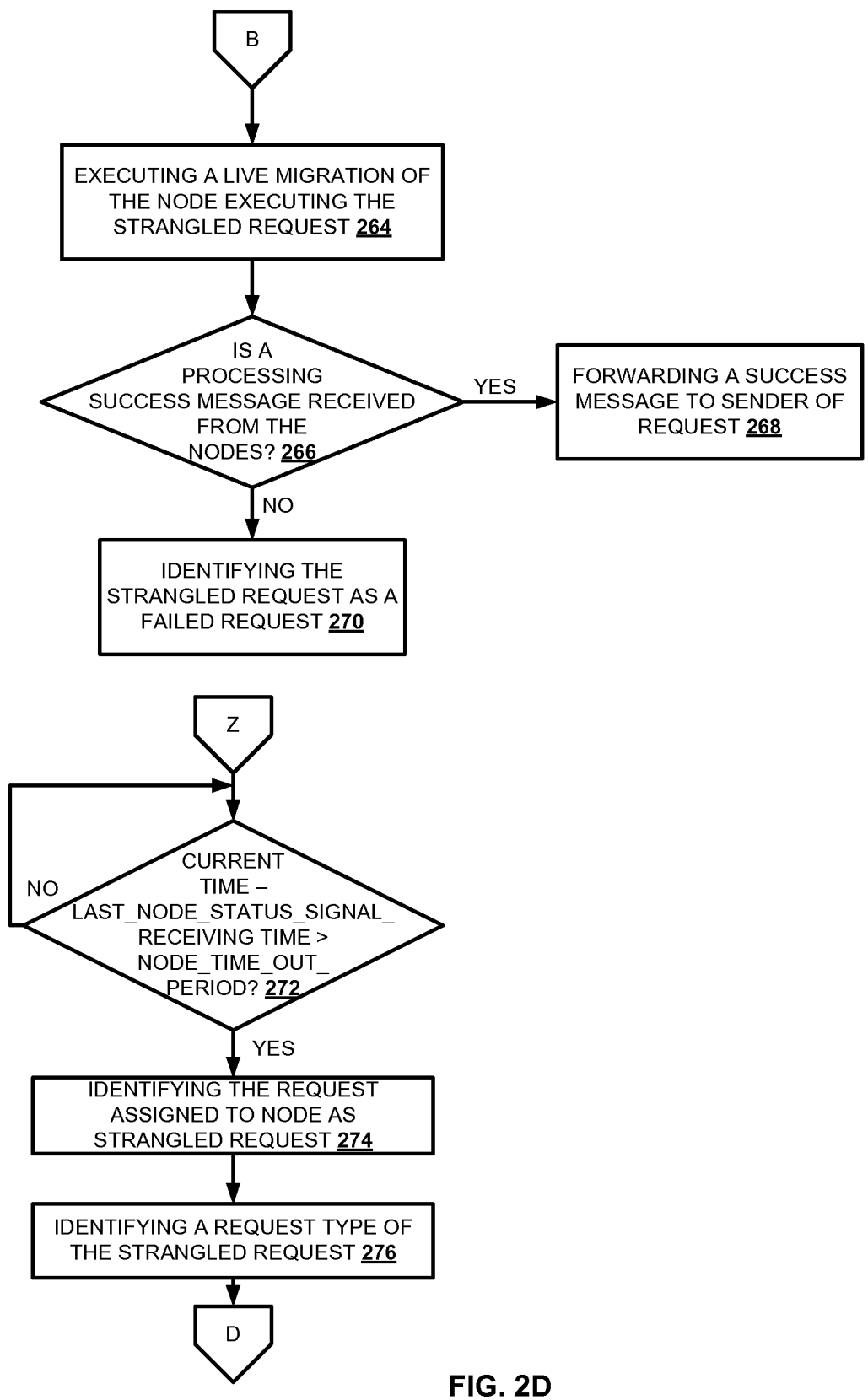
Figure 2E:
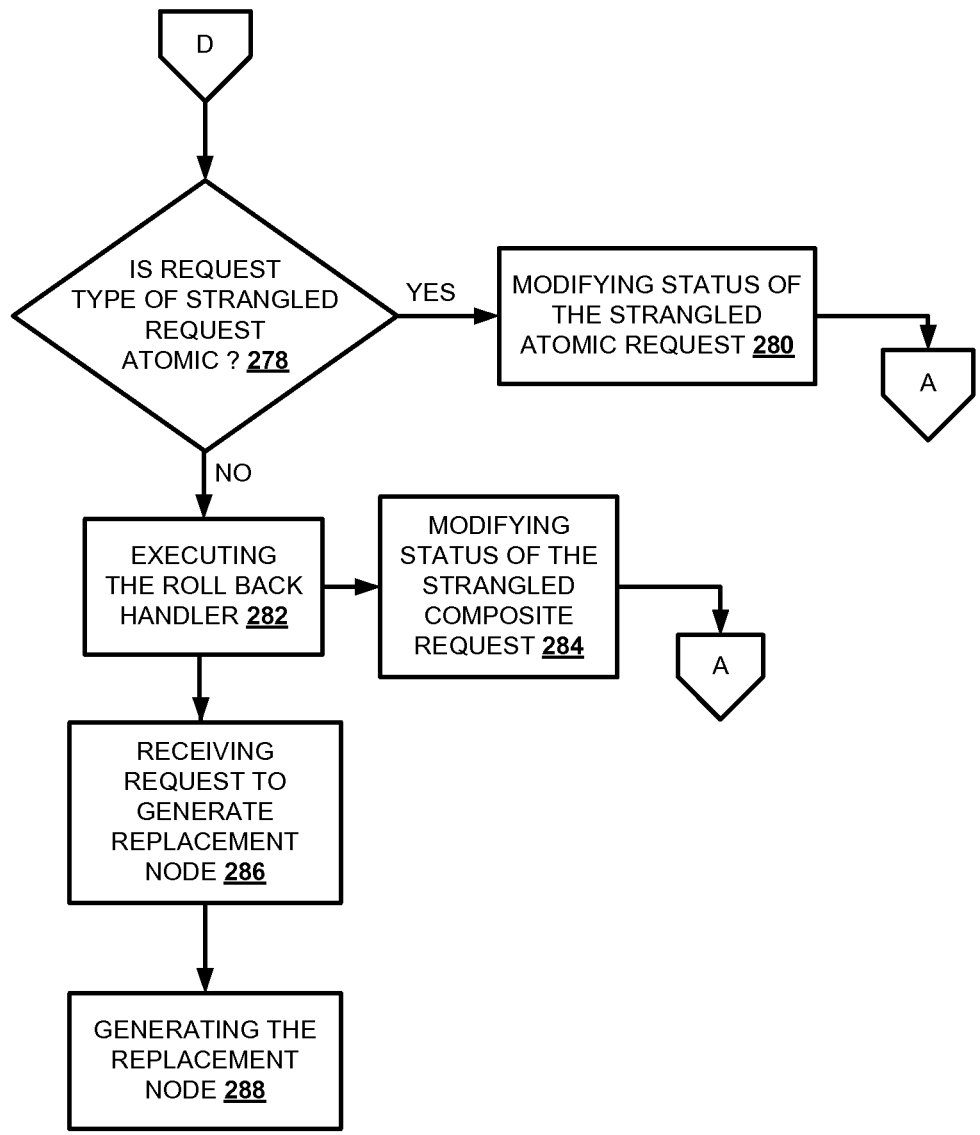

FIG. 1 is a block diagram illustrating a cluster 100 in a distributed computing environment, according to an embodiment. Distributed computing or cloud computing includes a large number of computers connected through a real-time communication network, such as the Internet. In one embodiment, the distributed computing environment is provided by an Infrastructure-as-a-Service (IaaS) framework. The distributed computing environment may be provided by multiple IaaS frameworks. An IAAS framework may include computing resources, for example, physical or virtual machines (VMs), and other additional resources such as a virtual-machine disk image library, raw (block) and file-based storage, firewalls, IP addresses, virtual local area networks (VLANs), etc. In one embodiment, the IaaS framework may be provided by an IaaS-cloud provider that supplies these resources on-demand.

In one embodiment, the cloud computing environment may include a cluster 100. A cluster 100 may include several nodes that are connected. The nodes in the cluster 100 may include a manager node 102 and several request processing nodes 104 and 106. In one embodiment, the request processing nodes 104 and 106 may include several servers 108 and 110, respectively, for processing a request. For example, the servers may include an enrollment server for enrolling portable electronic devices to a managed device environment, and a package server for serving application packages to portal electronic devices using application policies, etc. In one embodiment, the nodes 102, 104, and 106 in the cluster are virtual machines (VM) provided by the Infrastructure as a Service (IaaS) framework. In other embodiment, the nodes 102, 104, and 106 may be physical machines.

The manager node 102 includes several modules for managing the request processing nodes 104 and 106. In one embodiment, the manager node allows scaling-up or scaling-down of the nodes in the cluster. In one embodiment, scaling up includes adding new nodes to the cluster. In one embodiment, scaling down includes reducing the number of nodes in the cluster by removing some nodes from the cluster. The manager node 102 also ensures a seamless execution of requests during node failures. The manager node includes several modules for managing the request processing nodes. For example, the manager node 102 includes a signal handler 112 that receives signals to increase or decrease the number of nodes in the cluster 100. The signals may be received based on the different conditions, for example user defined signals may be received when a user wants to increase or decrease the number of nodes in the cluster, or an external signal may be received to scale-up the number of nodes, when the memory-and-network usage based parameters for any of the nodes in the cluster is above a pre-determined limit. The signal handler 112 may then forward the request to a cluster controller 114. The cluster controller 114 then instructs a cloud manager 116 to increase the number of nodes based on the received signal.

In one embodiment, a cloud manager 116 communicates with the underlying IaaS framework to create new VM instances. The new VM instances include servers and a node controller to communicate with the manager node 102. The manager node 102 therefore allows scale-up or scale-down the number of request processing nodes in the cluster 100. Further, the request processing nodes 104 and 106 include a node controller 118 and 120, respectively, that sends node status information to the cluster controller 114 of the manager node 102. The node status information informs the manager node 102 about the status of the request processing nodes 104 and 106, i.e., whether the request processing nodes 104 and 106 are working properly or have failed. In case the cluster controller 114 identifies a node failure of any of the request processing nodes 104 or 106 then the manager node 102 re-distributes the requests that are being processed by the failed node to any other node in the cluster. The request manager 102 therefore ensures a seamless execution of the requests.

FIGS. 2A-2E is a flow diagram 200 illustrating a process for managing nodes in a distributed computing environment, according to an embodiment. Managing nodes include managing execution of requests by the request processing nodes, managing scale-up and scale-down of the nodes, generating reports related to the nodes and the requests being processed, and managing load, etc. Initially a to-be-processed request is received (202). In one embodiment, a to-be-processed request is a request that is to be processed by the servers included in the request processing nodes of the cluster. The to-be-processed request may be received from several sources. For example, the to-be-processed request may be received from a portable electronic device to enroll a portable electronic device with an enrollment server. Similarly, server initiated requests may be received from the different servers included in the request processing nodes.

In one embodiment, the requests may be categorized in different request types. The different request types may include outbound request, i.e., requests from the distributed computing environment to any device or system outside the environment or an inbound request, i.e., requests from an outside device or system to the distributed computing environment. The different outbound request type may include, for example, Configuration policies, packages, session policies, simple messages, Emails, SMS. The different inbound request type may include, for example, feedback service response, device inventory detail, etc. The to-be-processed request may be received at a request manager module included in the manager node. The status of the to-be-processed request received at the request manager may be "new".

In one embodiment, the request manager then executes admission control logic to determine whether the received to-be-processed request can be processed by the request processing nodes. During admission control, the request manager identifies whether the received number of to-be-processed requests is greater than the maximum-request-limit (204). The maximum-request-limit is the maximum number of requests that may be serviced by the different request processing nodes in the cluster at a particular time. When the number of to-be-processed requests is greater than the maximum-request-limit, then the request manager may identify the maximum-request-limit number of requests, from the received to-be-processed requests, as the to-be-processed request (206). In this case, the request manager may admit the maximum-request-limit number of to-be-processed request for processing. The remaining to-be-processed requests may be terminated by the request manager. In one embodiment, the request manager sends a return code for the requests that were terminated by the request manager. For example, consider that 65 enrollment requests is received by the request manager and the maximum number of requests that may be serviced by the request manager is 40 then 40 enrollment requests, from the 65 enrollment requests are admitted for processing by the enrollments servers included in the request processing nodes of the cluster. The remaining 25 requests are then terminated and a return code is then sent to a source from where these 25 requests were received.

In one embodiment, the request manager may also perform a request validation during the admission control. During the request validation, the request manager validates the requests by checking whether the request is well-formed, etc. The request manager also provides methods to register validation handlers. A validation handler contains code to validate requests for different request types. In one embodiment, the validation handlers are then used to validate a request of a particular request type.

Next, request processing nodes for processing the to-be-processed requests is identified. In one embodiment, the request manager identifies the to-be-processed requests based on several node level parameters of the request processing nodes. The node level parameters may include CPU usage, cache memory usage, network traffic, average delay in request processing ($\Delta$), and cumulative load (CL). CPU usage is the amount of actively used virtual CPUs as a percentage of total available CPU. CPU usage is the average CPU utilization over the available virtual CPUs in the virtual machine. For example, if a VM with one virtual CPU is running on a host that has four physical CPUs and the CPU usage is 100%, the virtual machine is using one physical CPU. A cache memory is a cache used by the central processing unit (CPU) of a computer to reduce the average time to access memory. The cache is a smaller, faster memory which stores copies of the data from frequently used main memory locations. CPUs may have different independent caches, including instruction and data caches, where the data cache is usually organized as a hierarchy of more cache levels (L1, L2 etc.). In one embodiment, the cache memory may also include primary memory. Network usage indicates the network resources used by a particular node. In one embodiment, the average delay in request processing ($\Delta$) by a node may be determined based on the following formula:

$$\Delta = (1/n) * \Sigma_{i=1 \, to \, n}(PTri-IPTr),$$

where IPTri=Ideal processing time for a request type "r", and PTri=Processing time taken by "$i^{th}$" request of type "r", and n=number of requests received in a pre-determined time.

A negative value of $\Delta$ for a given request type "r" indicates that the node is processing data faster than the pre-determined ideal processing time. A cumulative load (CL) of a node is a tuning parameter and provides a way to specify effect of a request on the total load on a node. Cumulative load for a node may be calculated by the following formula:

$$CL_t = ((CPU_w * CPU_t) + (Cache_w * Cache_t) + (Network_w * Network_t),$$

Where $CL_t$=Cumulative load on a given node at time "t"
  $CPU_w$=CPU weightage on total load;
  $Cache_w$=Cache weightage on total load;
  $Network_w$=Network weightage on the total load;
    $CPU_t$=CPU usage at time 't';
    $Cache_t$=Cache usage at time 't';
  $Network_t$=Network usage at time 't'

In one embodiment, the cumulative load may be determined by another formula, e.g., by removing one or more parameters from the formula. To identify the request processing nodes, initially a list of request processing node in the cluster is received by the request manager (208). The request manager then compares the node parameter values $CPU_t$; $Cache_t$; and $Network_t$ of the node with the pre-determined maximum node parameter values CPU usage upper limit ($\alpha$), primary memory usage upper limit ($\beta$), and network traffic usage upper limit ($\gamma$), respectively (210). In one embodiment, pre-determined values of CPU usage upper limit ($\alpha$), primary memory usage upper limit ($\beta$), and network traffic usage upper limit ($\gamma$) for a particular node type may be provided by an end user. Further, the system allows a user to modify these values $\alpha$, $\beta$, and $\gamma$ during runtime. In case, any one of the node parameter values for a particular node is greater than the corresponding pre-determined maximum node values, then that node is identified as a "loaded" node and is removed from the list of request processing nodes (212).

For the remaining request processing nodes in the list, a comparison is performed between the cumulative load values of a request processing node in the list with another request processing node in the list (214). In case the cumulative load of a particular node is lesser than the cumulative load of another node then the particular node and another node are re-arranged in the list (216). In one embodiment, re-arranging the list includes moving the particular node ahead of another node in the list of request processing nodes. For example, assume that there are four request processing nodes, node 1, node 2, node 3, and node 4, in the list with cumulative load values 65%, 71%, 62%, and 75%, respectively. In this case, the nodes are re-arranged according to the cumulative values to identify nodes node 3, node 1, node 2, and node 4. Next, based on the arranged list of the nodes the request processing nodes for processing the to-be-processed request is determined (218). Identifying the request processing nodes for processing the to-be-processed request based on the cumulative load of the nodes ensures balancing of load across the nodes, and avoids overloading of an already loaded node, i.e., a node having a high cumulative load value.

Further, in case the cumulative node values of the node and the another node is same (220) then the average delay in request processing ($\Delta$) of the node are compared with the another node to determine whether the average delay in request processing by the node is less than the average delay in request processing of the another node (222). When the average delay in request processing of node is less than the average delay in request processing of another node then the particular node and another node are re-arranged in the list. In one embodiment, re-arranging the list includes moving the particular node ahead of another node in the list of request processing nodes.

Next a check is performed to determine whether the to-be-processed request can be divided into sub-requests (224). In one embodiment, some of the to-be-processed requests can be divided into sub-requests. For example, a package push request using an application policy to 10000 devices can be handled separately by a package server included in different nodes. Therefore, the package push request is a request that can be divided into sub-requests. Alternatively, some of the requests cannot be divided into sub-requests. For example, content push to a mobile device which is of size 500 MB is a request that cannot be divided into sub-requests. In case the to-be-processed request cannot be divided into sub-requests then the to-be-processed request is assigned to the nodes identified at 218 (226). Once the node starts processing the to-be-processed request then the status of the request are changed to "in progress" request. In one embodiment, the to-be-processed request is assigned according to the order of the request processing nodes in the list of request processing nodes. For example, in case a request cannot be divided then the request would be assigned to the first node in the list of request processing nodes identified at 218.

In case the request can be divided then the request is divided into several sub-requests (228). In one embodiment, a request divider divides the request into several sub-requests. A check is then performed to determine whether a summation of maximum number of requests "Xit" is greater than the number of sub-requests "n" of the to-be-processed requests (230). In one embodiment, Xit may be the maximum number of requests that may be processed by a node "i", from the identified request processing nodes. For example, consider that three request processing nodes, node 1, node 2, and node 3, are identified for processing a to-be-processed request. Assume that maximum number of requests Xit that may be processed by node 1, node 2, and node 3 are 30, 50, and 90, respectively. In this case the sum of the Xit 30, 50, 90 that may be processed by the nodes 1, 2, and 3, respectively is 170. Further, assume that the number of sub-requests of the to-be-processed request is 120. In this case, as the summation of Xit 170 is greater than the number of sub-requests 120 therefore the sub-requests can be processed by the nodes.

In one embodiment, the node "i" is a virtual machine (VM) of a particular type. A VM type may categorize VMs according to the processor, CPU, and network performance of a particular VM. For example, the VM type may be small, medium and large corresponding to the processor, CPU, and network performance of the VMs. In one embodiment, Xit may be the maximum number of requests that may be processed by a node "i" of a particular VM type. In one embodiment for determining whether maximum number of requests "Xit" is greater than the number of sub-request "n", initially a pre-determined cumulative load ($CL_r$) value for a particular VM type is received. A cumulative load ($CL_r$) value is a load generated by a single request of particular request type "r" on a node for a particular VM type in the underlying IaaS framework. In one embodiment, the $CL_r$ value may be re-written by a user. For example, the pre-determined $CL_r$ value for a VM type "small" may be 4%. Next the maximum number of requests "Xit" that may be processed by a particular node "i" is determined using the formula:

$$Xit = (1 - CL_{it})/CL_r,$$

where $CL_{it}$=Cumulative load by the sub-requests on node "i" at time "t"

In case the determined maximum number of to-be-processed requests "Xit" is greater than the number of sub-requests "n" of the to-be-processed requests then the sub-requests can be processed by the nodes identified at 218. In this case, the sub-requests are assigned to the identified nodes (232)

In case the summation of the maximum number of requests "Xit" is less than or equal the number of sub-requests of the to-be-processed request then a request is sent to generate additional request processing nodes for the cluster (234). In one embodiment, when the maximum number of requests that may be processed is less than the number of sub-requests indicates that additional request processing nodes are required for processing the sub-requests of the request. A number of additional request processing nodes to be added to the cluster is then determined (236). In one embodiment, an additional cumulative load may be calculated to identify the number of additional nodes that are to be added to the cluster. The additional cumulative load is the additional load that may be generated in case the sub-requests are submitted to the request processing nodes for processing, after utilizing the CPU and cache-memory of the identified request processing nodes VMs. In one embodiment when the number of request processing nodes identified is "m" and the number of sub-requests to-be-processed request is "n" then the additional cumulative load (ACL) is calculated using the following formula:

$$ACL = (n - (\Sigma_{i=1 \, to \, m} Xit)) * CL_R$$

In the above formula $(n - (\Sigma_{i=1 \, to \, m} Xit))$ represents the number of pending sub-requests that are remaining after utilizing the CPU and cache-memory of the identified request processing nodes VMs. A number of additional nodes for processing the sub-requests is then determined based on the determined additional cumulative load. In one embodiment, determining the number of additional nodes to be added includes determining the number of additional VMs that are to be added for processing the additional cumulative load. In one embodiment, the signal handler module determines the number of additional VMs based on the additional cumulative load (ACL), for a particular VM type, and the pre-determined cumulative load value ($CL_R$) for a particular VM type in the IaaS framework. For example, consider the ACL for processing sub-requests of a request is determined as 320% and the CLr for a small VM type is 4% and a large VM type is 2%. In case the signal handler assumes 80% utilization as full utilization of VM then the signal handler determines the number of small type VMs as 4 (80*4=320). Further, the ACL for processing sub-requests would be determined as 160% when the IaaS framework includes VM of type "large". In this case, the number of large type VMs is determined as 2 to service the additional cumulative load.

In one embodiment, when the summation of the maximum number of requests "Xit" is equal to the number of sub-requests of the to-be-processed request then the number of additional nodes may be determined based on a pre-determined buffer cumulative load instead of the ACL. A predetermined buffer cumulative load is a parameter which implies a pre-determined additional amount of load that the cluster should be able to accommodate at any point of time.

Next the determined number of additional nodes is generated (238). In one embodiment, the signal handler transfers the determined number of additional request processing nodes to a cluster controller that then calls a cloud manager to generate and add the determined number of additional nodes for the cluster. A cloud manager is a module included in the manager node. The cloud manager facilitates communication between the cluster controller and the underlying IaaS framework. In one embodiment, the cloud manager provides APIs to manage node instances in the cluster. The cloud manager also stores endpoints of the IaaS framework and configures different cloud brokers to provide different cloud based services, including cluster management services, such as increasing or decreasing the number of nodes in the cluster, snapshot management services, maintaining block or object storage, etc. A cloud broker is an intermediary between the cloud manager and the underlying IaaS framework provided by different vendors. In one embodiment, the cloud broker may be provided to communicate with the IaaS framework provided by different vendors, for example, an Amazon Web Service™ (AWS) broker may be provided to communicate with an IaaS framework provided by Amazon™.

In one embodiment, the underlying IaaS framework includes a virtual machine (VM) template for the different type of nodes, for example, request processing node, manager node, manager helper node, etc. The VM template is a template including different modules included in a request processing module. A VM template is a master copy of a request processing node VM and may be used to create instances of the request processing node VM. In one embodiment, a request processing node includes a node controller module, a node metrics notify module, and a node update module, and servers. The node controller module may provide status information of the request processing node to cluster controller included in the manager node. The status information may provide information about the availability of the request processing node to the cluster controller. A node metric notify module provides the request processing node specific information, for example, CPU usage, primary memory usage, and network usage related to a particular network. The node metric notify module provides the node information to the node controller. The node update module is a module that is used for upgrading the servers included in the request processing node. In one embodiment, the VM template includes a pre-installed node controller module, node metrics notifier module, node update module, and the servers. The cloud manager using the cloud broker generates the determined number of request processing node VMs.

Next the sub-requests are assigned to the nodes identified at 218 and the additional nodes generated at 238 (240). In one embodiment, the added nodes are included in the list of nodes identified for processing the sub-requests. In one embodiment, the Request Manager persists the requests or the sub-requests to back-end system before the requests are assigned to the identified nodes and the additional nodes. After the request has been assigned a check is performed to determine whether a processing success message is received from the identified nodes and the additional nodes (242). The processing success message may indicate that the message has been successfully processed by the identified nodes and the additional nodes.

In one embodiment, after receiving the processing success message a request may be received for displaying the processed request report (244). In one embodiment, a "success" message is received after the processing success. In one embodiment, the processed request report is a report displaying the requests that have been successfully processed. The requests may also be received for displaying in-progress request report that includes information related to the different requests that are being processed by the different request processing nodes at a particular time, request rejection report that includes information related to the different requests that have been rejected, request processing time report, average delay in request processing report, etc. In one embodiment, the manager node also allows creation of snapshot of the cluster. A snapshot includes details of the cluster, for example, manager node snapshot, request processing node snapshot, etc. In one embodiment, the manager node also includes an alert manager that generates alert depending on events raised by different modules. For example, the alert manager generates an alert message when the number of nodes in the cluster reaches the maximum node limit defined for the cluster.

Next in case a processing success message is not received then a check is performed to determine whether node status information is received from the nodes (246). In one embodiment, the check at 246 may be performed anytime during the process for managing the nodes. For example, the check may be performed before receiving a request, during comparison of cumulative loads of nodes, during the assignment of requests to nodes, etc. In one embodiment, the node controller included in the request processing nodes, processing the to-be-processed requests or the sub-requests of the to-be-processed request, sends node status signal at regular intervals to the cluster controller. The node status signal informs the manager node that the request processing node is available and has not failed. When the node status information is received from the nodes processing the to-be-processed request, a check is performed to determine whether the difference between current time and request submission time is greater than a predetermined request timeout period (248). In case the condition in 248 is true then the request is identified as a "strangled request" (250). For example, consider that the current time is 10 pm. The request was submitted to a node at 8 pm. The difference between current time and request submission 2 hours (10 pm–8 pm) time is greater than the request time out period 1 hour. Therefore, the request is identified as a "strangled request".

Next, a request type of the strangled request is identified (252). In one embodiment, a request is categorized in two types: atomic request, and composite request. Atomic requests are requests which can be terminated without affecting any other node or process, i.e., there is no "side effects" created by an "in-progress" request. An "in-progress" atomic request may be terminated at any stage and then re-submitted for processing. Composite request is a request that is in different intermediate states during the processing of the request. The composite request creates "side effects" during the processing of the request. In order to terminate an "in-progress" composite request, the different actions, for example, deletion or modification of entries made in tables, creation or update of configuration files, etc., performed by the in-progress composite request is undone.

Next a check is performed to determine whether the request type of strangled request is atomic request (254). In case the strangled request is of type atomic request then the status of the strangled atomic request is modified (256). In one embodiment, the request manager changes the status of the strangled atomic request from "in progress" to "pending" status. In case the strangled request is a composite request (condition in 254 is false) then a determination is made whether a rollback handler for the request type of the composite request is registered (258). In one embodiment, a rollback handler rolls-back the "side effects" created due to the "in-progress" composite request. In case a roll-back handler is registered corresponding to the request type of the composite request then the rollback handler is executed to reverse the "side effects" create due to the "in-progress" composite request (260). Next, the status of the strangled composite request is modified (262). In one embodiment, the request manager changes the status of the strangled composite request from "in progress" to "pending".

Next steps 204-240 are repeated to re-assign the atomic requests or the composite request having "pending" status to other nodes. In one embodiment, the requests (atomic or composite) stored in the backend system are used for re-assigning the requests to the nodes. In one embodiment, when a rollback handler is not registered for the request type of the strangled request then a "live migration" of the node executing the strangled request is executed (264). In one embodiment, the "live migration" is initiated after a predetermined rollback timeoutperiod. In one embodiment, live migration refers to the process of moving a running virtual machine node executing the strangled composite request between different physical machines without disconnecting the client or application. Memory, storage, and network connectivity of the virtual machine are transferred from the original host machine to the destination.

In one embodiment, a check is then performed to determine whether a process success message is received from the nodes executing the strangled request (266). In one embodiment, the check is performed to determine whether the strangled request has been processed by the re-assigned node or the migrated node within a pre-determined repeated requested timeout period. In case the strangled request has been processed then a success message is forwarded to the sender of the request (268). In case, the strangled request has not been processed then the request is identified as failed request (270).

In one embodiment, when a failure message is received (condition in 242 is false) then 204-240 are repeated to re-assign the "failed" requests to other nodes.

In one embodiment, when node status information has not been received from the request processing nodes processing the requests or sub-requests then initially a check may be performed to determine whether the difference between current time and last node status information receiving time is greater than a predetermined node timeout period (272). In case the condition is true it indicates that the node has become un-responsive. In one embodiment, a node may become un-responsive due to several reasons, for example, host machine error, IaaS framework exceptions, etc. Next when the condition is true then the requests or sub-requests assigned to the un-responsive node are identified as a strangled request (274).

Next a request type of the strangled request is identified (276). In case the request type of the strangled request is identified as atomic (278) then the status of the strangled atomic request is changed from "in-progress" to "pending" (280). In case the request is a composite request then roll back handlers are executed to reverse the "side effects" created due to the "in-progress" strangled composite request (282). Next, the status of the strangled composite request is modified (284). In one embodiment, the request manager changes the status of the strangled composite request from "in progress" to "pending".

Next steps 204-240 are repeated to re-assign the atomic requests or the composite request having "pending" status to other nodes. In one embodiment, the requests (atomic or composite) stored in the backend system are used for re-assigning the requests to the nodes. Next a request is received to generate a replacement node (286). In one embodiment, the request is received for generating a replacement node corresponding to the strangled node. Next based on the received request the replacement node is generated (288). In one embodiment, a signal handler initially identifies set of services that were exposed by the strangled node. Next, the signal handler calls cluster controller to generate a new node and also pass the set of platform services that should be started in the replacement node. The set of platform services to be started in the replacement node is same as the set of services provided by the strangled node. Finally, the cluster controller provides this information to a cloud manager, which using the cloud brokers to generate a virtual machine instance as the replacement node. In this way seamless availability for processing the requests is provided.

In one embodiment, seamless availability for processing is also provided when the manager node fails. To provide seamless availability, the cluster includes a manager shadow node that includes the modules, for example, request manager, cluster controller, etc., included in the manager node. When the manager node failure is detected then the IP address configured to manager node is re-assigned to the manager shadow node.

In one embodiment, the cluster also includes a manager helper node that shares the load of manager node when the manager node becomes loaded. The manager helper node includes a subset of modules included in the manager node. In one embodiment, the manager helper node includes modules related to pre-processing a request, for example, a request divider, and a request dispatcher to assign the requests or sub-requests to several nodes, a node controller, a request balancer which performs a load balancing when a particular node becomes loaded. The manager helper node also includes distributed caching framework and runs a cache server within it. It enables the platform to cache objects in multiple master helper nodes simultaneously and provides a unified way to access those objects.

In one embodiment, the manager node also upgrades the servers running in different request processing node from one version to another version. For upgrading the node, the virtual machine template that is used for generating request processing node virtual machine is first upgraded. This ensures that further request processing node VM instances are created using the upgraded virtual machine template. Next, the running request processing node VMs in the cluster is upgraded. The running request processing node VMs represents the request processing nodes that are included in the cluster. Upgrading the running request processing nodes instead of individually creating new upgraded nodes corresponding to the nodes in the cluster reduces the number of instance creation requests for performing the upgrade operation.

Figure 3A:
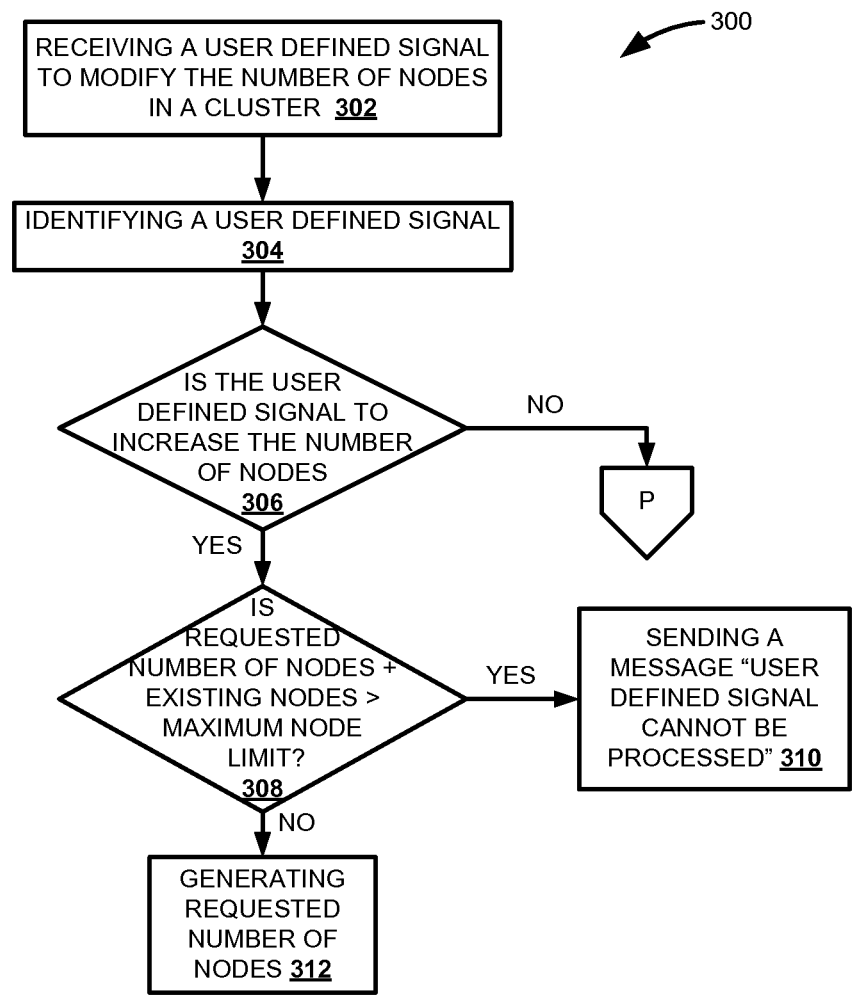
FIGS. 3A-3B is a flow diagram illustrating a process to increase or decrease the number of nodes in a cluster based on user defined signal, according to an embodiment.
Figure 3B:
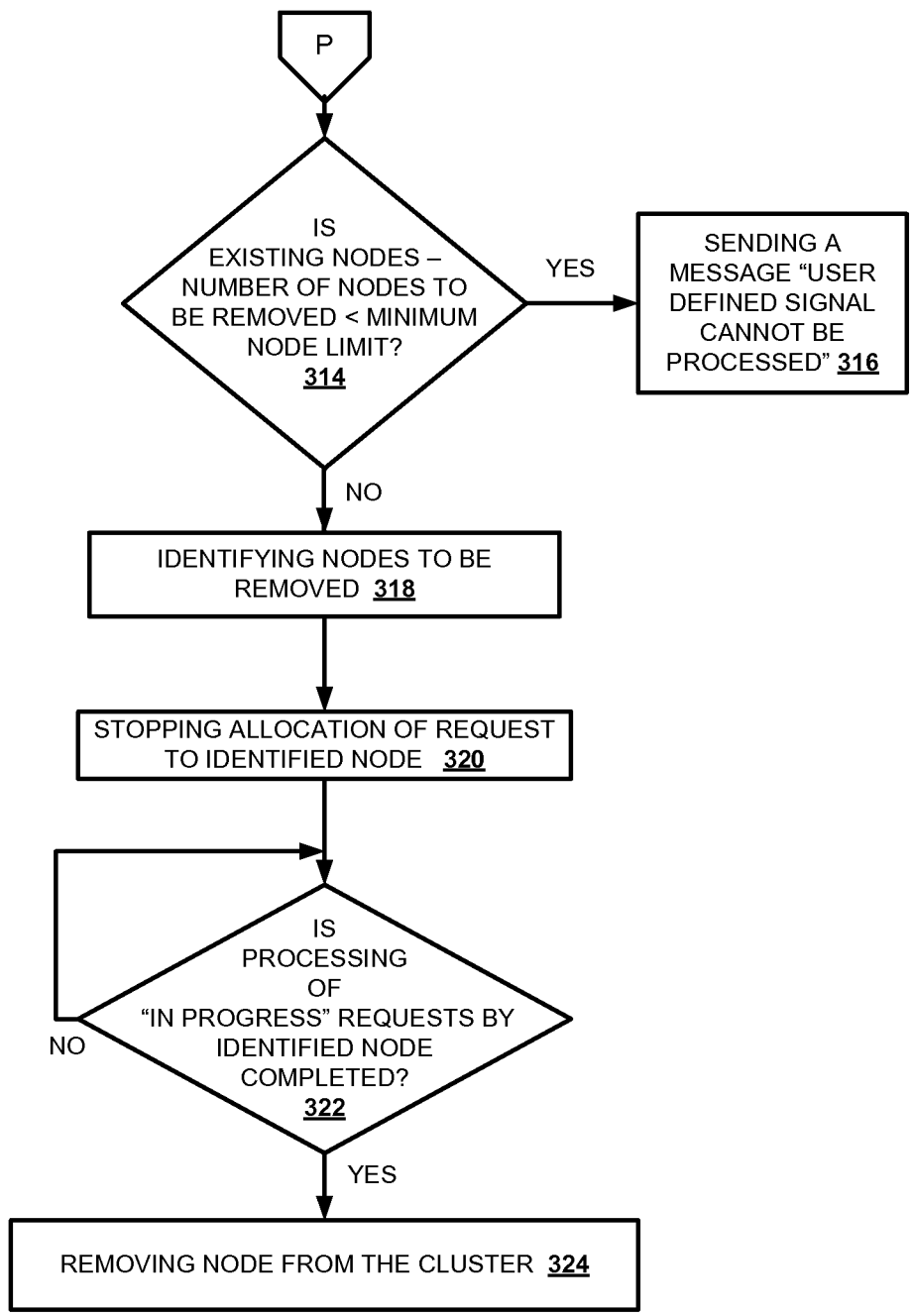

FIGS. 3A-3B is a flow diagram 300 illustrating a process to increase or decrease the number of nodes in a cluster based on user defined signal, according to an embodiment. Initially a user defined signal 302 is received from a user to modify the number of nodes in the cluster. A user defined signal includes instruction received from an end user to increase or decrease the number of nodes in the cluster. The user defined signal may also include a number of nodes that the user wants to add or remove from the cluster. The user may also specific a condition to trigger the process for increasing or decreasing the number of nodes in the cluster. For example, a user defined signal may be a scheduled scale-down during weekends, or scale-up during business hours, etc. The user defined signal may then be stored in the system.

Next user defined signals are identified at pre-determined intervals (304). In one embodiment, a signal handler included in the manager node checks for any user defined signals at regular intervals. In case a user defined signal is identified then a check is performed to determine whether the user defined signal is to increase the number of nodes in the cluster (306). In one embodiment, the user defined signal may be to trigger a snapshot generation at a pre-determined time, or applying upgrade. In case the user defined signal is to increase the number of nodes in the cluster then a check is performed to determine whether sum of requested number of nodes in the user-define signal and existing number of nodes in cluster is greater than a pre-determined maximum node limit (308). The pre-determined maximum node limit defines the maximum nodes that can exist in the cluster. In case the condition is true then a message may be sent to the user that the user defined signal cannot be processed (310).

In case the sum is less than the pre-determined maximum node limit, then the requested number of node instances is generated (312). In one embodiment, the signal handler transfers the user defined signal to cluster controller. The cluster controller then forwards the user defined signal to cloud manager that generates instances from the request processing node template stored in the IaaS framework. In one embodiment, a node instance is generated corresponding to the number of nodes that are to be added to the cluster. Finally, the generated node instances are added to the cluster.

In one embodiment, when the user defined signal is for decreasing the number of nodes in the cluster then a check is performed to determine whether the difference between the existing number of nodes in the cluster and the number of nodes to be removed from the cluster is less than the pre-determined minimum node limit (314). In case the condition in 314 is true then a message may be sent to the user that the user defined signal cannot be processed (316). Next the nodes that are to be removed from the cluster are identified (318). In one embodiment, the signal handler identifies the nodes that are to be removed from the cluster for decreasing the cluster size. Allocation of new requests to the identified node is then stopped. In one embodiment, the signal handler stops allocating new requests to the identified node (320).

Next in case the identified nodes are processing some requests, a check is performed to determine whether the processing of these "in-progress" requests is completed (322). When the processing of the request is completed then the identified nodes are removed from the cluster (324). In one embodiment, the signal handler transfers the user defined signal to cluster controller. The cluster controller then forwards the user defined signal to cloud manager that removes the instances of the identified nodes from the cluster. A cluster with a reduced number of nodes is obtained after the node instances are removed from the cluster.

Figure 4:
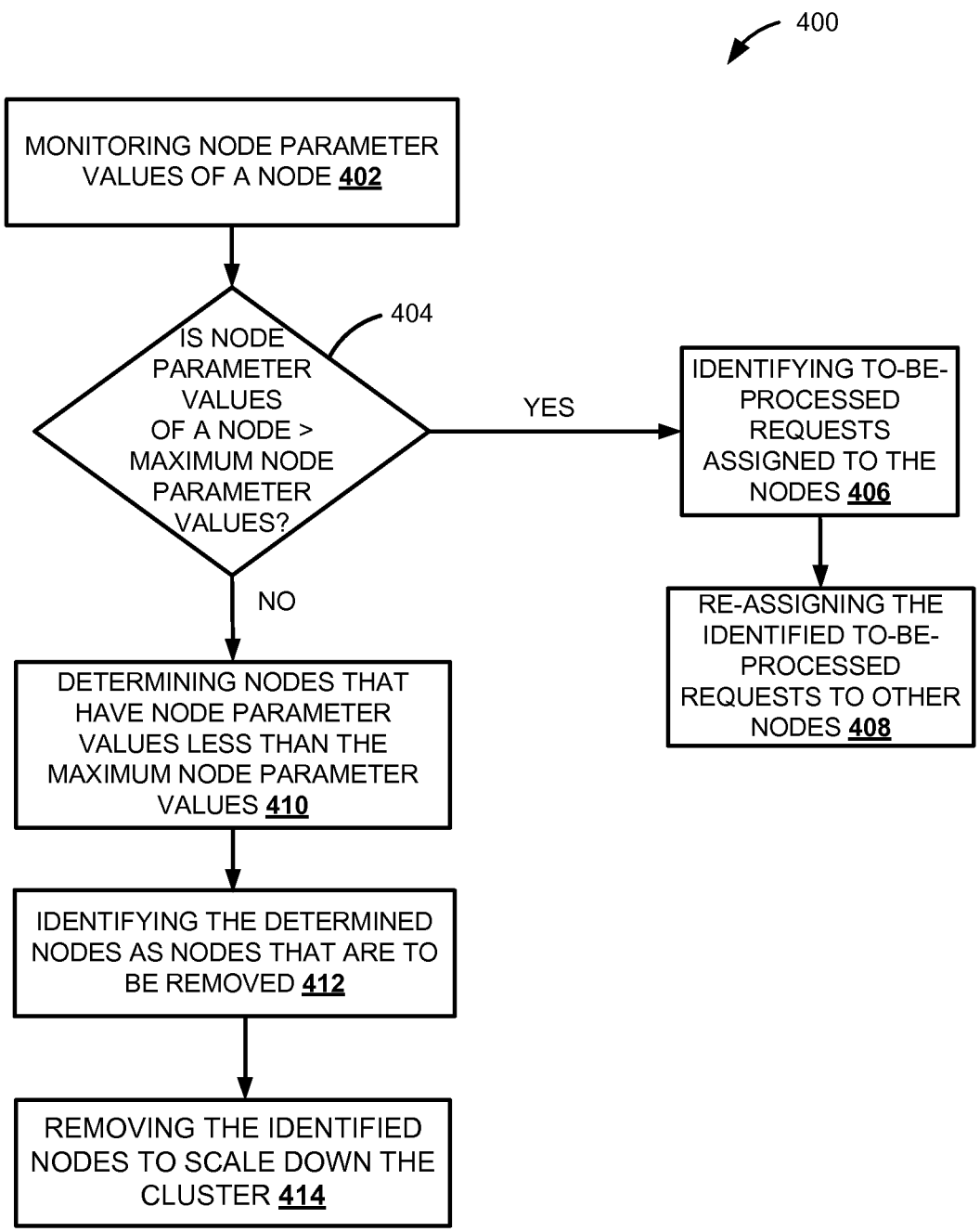
FIG. 4 is a flow diagram illustrating a process to increase or decrease the number of nodes in a cluster based on node level parameters, according to an embodiment.

FIG. 4 is a flow diagram illustrating a process 400 to increase or decrease the number of nodes in a cluster based on node level parameters, according to an embodiment. Node level parameter values for a node may be monitored (402). The node level parameters of the nodes in a cluster may include a CPU usage of the node at a particular time ($CPU_t$), Primary memory usage of the node at a particular time ($Cache_t$), Network usage of the node at a particular time ($Network_t$), and Cumulative Load (CL). In one embodiment, the node parameter values may be monitored regularly at pre-determined intervals. Next, the node parameter values of the node are compared with pre-determined maximum node parameter values (404). In one embodiment, the pre-determined maximum node parameter values includes CPU usage upper limit ($\alpha$), Primary memory usage upper limit ($\beta$), and Network traffic usage upper limit ($\gamma$). In case the value for any of the node usage parameters, of a node is greater than the maximum node usage parameter values then the to-be-processed requests assigned to the node is identified (406). Next the identified to-be-processed requests are re-assigned to other nodes (408). In one embodiment, steps 204-240 discussed with respect to FIG. 2A-2E are executed for re-assigning the to-be-processed requests to other nodes.

In one embodiment, when the node parameters for nodes in a cluster is not greater than the predetermined maximum node parameter values then the nodes that have node parameters values less than the predetermined maximum node parameter values are identified (410). Next the identified nodes are determined as the nodes that are to be removed (412). Finally, the nodes identified at 412 are removed to scale down the cluster (414). In one embodiment, the steps 314-324 discussed with respect to FIG. 3 are executed to remove the identified nodes from the cluster.

Figure 5:
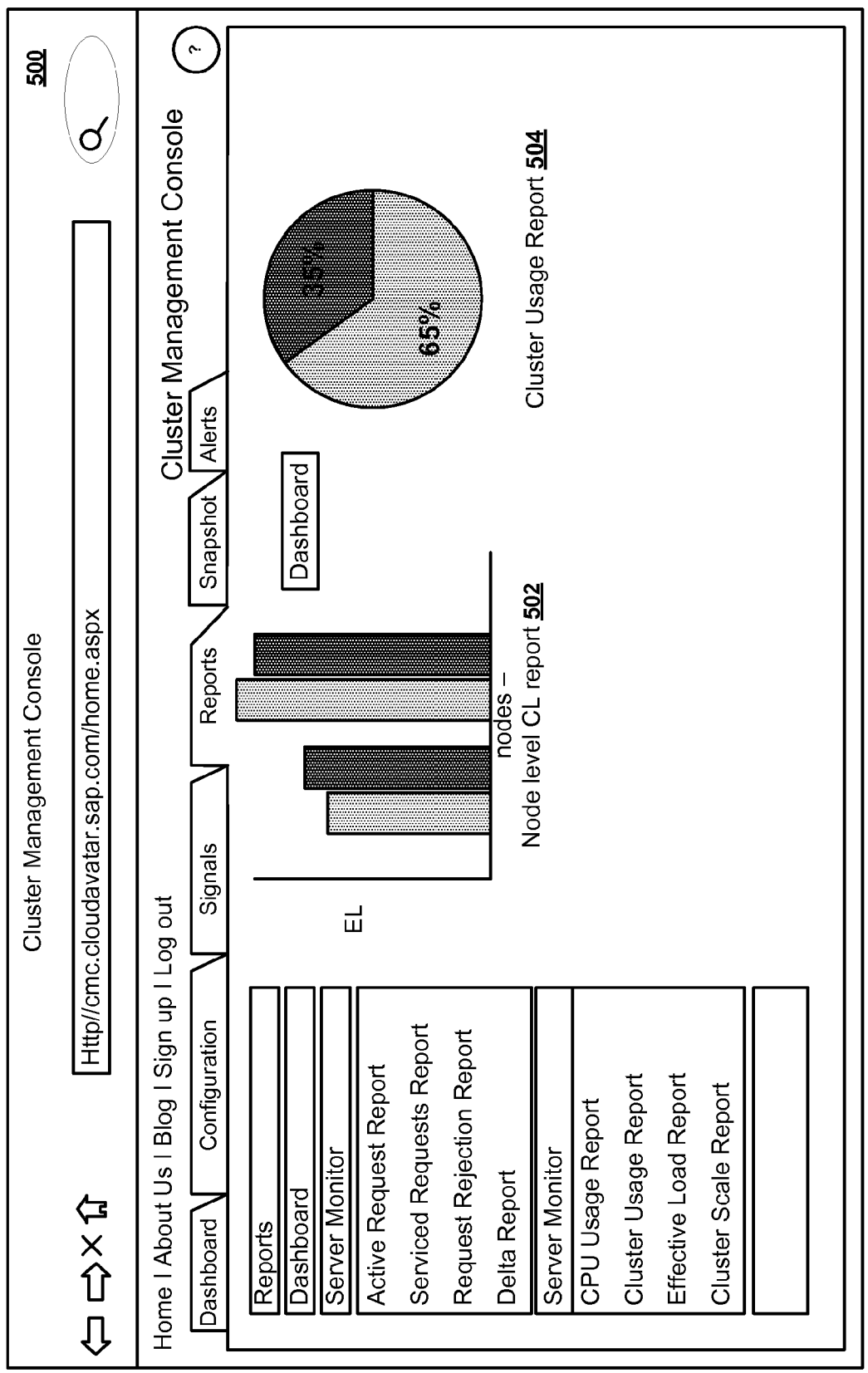
FIG. 5 is an exemplary user interface displaying a webpage including different node and request related reports, according to an embodiment.

FIG. 5 is an exemplary user interface displaying a webpage 500 including different node and request related reports, according to an embodiment. As shown, the webpage 500 includes a graph node level CL report 502 showing the cumulative load of the different nodes in the cluster. The webpage 500 also includes a cluster usage report 504 showing the percentage of cluster resources being used.

Some embodiments may include the above-described methods being written as one or more software components. These components, and the functionality associated may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components may be implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. A computer readable storage medium may be a non-transitory computer readable storage medium. Examples of a non-transitory computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 6:
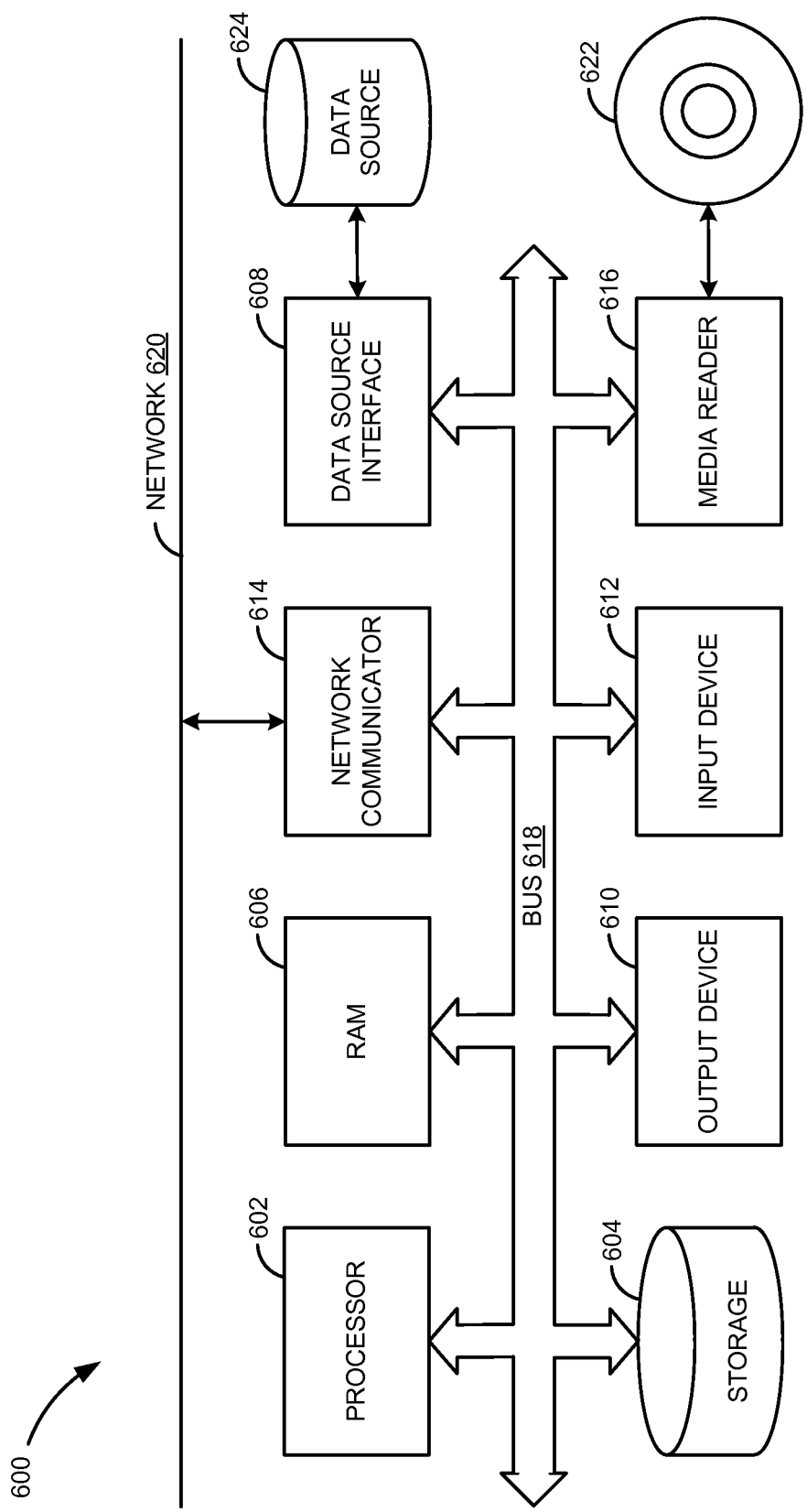
FIG. 6 is a block diagram illustrating a computing environment for managing nodes in a distributed computing environment, according to an embodiment.

FIG. 6 is a block diagram of an exemplary computer system 600. The computer system 600 includes a processor 602 that executes software instructions or code stored on a computer readable storage medium 622 to perform the above-illustrated methods. The processor 602 can include a plurality of cores. The computer system 600 includes a media reader 616 to read the instructions from the computer readable storage medium 622 and store the instructions in storage 1004 or in random access memory (RAM) 606. The storage 604 provides a large space for keeping static data where at least some instructions could be stored for later execution. According to some embodiments, such as some in-memory computing system embodiments, the RAM 606 can have sufficient storage capacity to store much of the data required for processing in the RAM 606 instead of in the storage 604. In some embodiments, the data required for processing may be stored in the RAM 606. The stored instructions may be further compiled to generate other representations of the instructions and dynamically stored in the RAM 606. The processor 602 reads instructions from the RAM 606 and performs actions as instructed. According to one embodiment, the computer system 600 further includes an output device 610 (e.g., a display) to provide at least some of the results of the execution as output including, but not limited to, visual information to users and an input device 612 to provide a user or another device with means for entering data and/or otherwise interact with the computer system 600. Such output devices 610 and input devices 612 could be joined by one or more additional peripherals to further expand the capabilities of the computer system 600. A network communicator 614 may be provided to connect the computer system 600 to a network 620 and in turn to other devices connected to the network 650 including other clients, servers, data stores, and interfaces, for instance. The modules of the computer system 600 are interconnected via a bus 618. Computer system 600 includes a data source interface 608 to access data source 624. The data source 624 can be accessed via one or more abstraction layers implemented in hardware or software. For example, the data source 624 may be accessed by network 620. In some embodiments the data source 624 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an undeCLying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in detail.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the invention are described herein for illustrative purposes, various equivalent modifications are possible within the scope of the invention, as those skilled in the relevant art will recognize. These modifications can be made in light of the above detailed description. Rather, the scope is to be determined by the following claims, which are to be interpreted in accordance with established doctrines of claim construction.

What is claimed is:

1. A computer implemented method for managing a plurality of nodes in a distributed computing environment, the method comprising:
   receiving, by a processor of a computer, a request to process a to-be-processed request;
   identifying, by the processor of the computer, one or more nodes from the plurality of nodes, included in a cluster, to process the to-be-processed request;
   dividing, by the processor of the computer, the to-be-processed request into a plurality of sub-requests;

based on a number of the plurality of sub-requests, generating, by the processor of the computer, an additional node for processing the plurality of sub-requests;
assigning the plurality of sub-requests to the identified one or more nodes and the generated additional node;
identifying a node failure of one of the one or more identified nodes; and
re-assigning one or more of the plurality of sub-requests assigned to the failed node to another node of the plurality of nodes.

2. The computer implemented method according to claim 1, wherein identifying the one or more nodes from the plurality of nodes comprises:
comparing a cumulative load of one of the plurality of nodes with a cumulative load of another of the plurality of nodes.

3. The computer implemented method according to claim 1, wherein identifying the one or more nodes from the plurality of nodes comprises:
comparing an average delay in request processing of one of the plurality of nodes with an average delay in request processing of another of the plurality of nodes.

4. The computer implemented method according to claim 1, wherein generating the additional node for processing the plurality of sub-requests includes:
creating an instance of a node template stored in an Infrastructure as a Service (IaaS) framework.

5. The computer implemented method according to claim 1, further comprising:
receiving, by the processor of the computer, a request to decrease a size of the cluster;
based on the received request, identifying at least one node to be removed from the cluster; and
removing the identified at least one node to decrease the size of the cluster.

6. The computer implemented method according to claim 1, further comprising:
receiving a request to generate a replacement node corresponding to the failed node; and
based on the received request, generating a replacement node.

7. The computer implemented method according to claim 1, further comprising:
comparing, by the processor of the computer, node level parameters of the plurality of nodes with pre-determined maximum values of the node level parameters; and
based on the comparison, modifying a number of nodes in the cluster.

8. A non-transitory computer readable storage medium to tangibly store instructions, which when executed by a computer, cause the computer to:
receive a request to process a to-be-processed request;
identify one or more nodes from a plurality of nodes, included in a cluster, to process the to-be-processed request;
divide the to-be-processed request into a plurality of sub-requests;
based on a number of the plurality of sub-requests, generate an additional node for processing the plurality of sub-requests;
assign the plurality of sub-requests to the identified one or more nodes and the generated additional node;
identify a node failure of one of the one or more identified nodes; and
re-assign one or more of the plurality of sub-requests assigned to the failed node to another node of the plurality of nodes.

9. The non-transitory computer readable storage medium according to claim 8, further comprising instructions which when executed by the computer further causes the computer to:
compare a cumulative load of one of the plurality of nodes with a cumulative load of another of the plurality of nodes.

10. The non-transitory computer readable storage medium according to claim 9, further comprising instructions which when executed by the computer further causes the computer to:
compare an average delay in request processing of one of the plurality of nodes with an average delay in request processing of another of the plurality of nodes.

11. The non-transitory computer readable storage medium according to claim 8, further comprising instructions which when executed by the computer further causes the computer to:
create an instance of a node template stored in an Infrastructure as a Service (IaaS) framework.

12. The non-transitory computer readable storage medium according to claim 8, further comprising instructions which when executed by the computer further causes the computer to:
receive a request to decrease a size of the cluster;
based on the received request, identify at least one node to be removed from the cluster; and
remove an instance of the identified at least one node to decrease the size of the cluster.

13. The non-transitory computer readable storage medium according to claim 8, further comprising instructions which when executed by the computer further causes the computer to:
receive a request to generate a replacement node corresponding to the failed node; and
based on the received request, generate a replacement node.

14. The non-transitory computer readable storage medium according to claim 8, further comprising instructions which when executed by the computer further causes the computer to:
compare node level parameters of the plurality of nodes with pre-determined maximum values of the node level parameters; and
based on the comparison, modify a number of nodes in the cluster.

15. A computer system for managing a plurality of nodes in a distributed computing environment, the computer system comprising:
a processor to execute a program code; and
a memory coupled to the processor, the memory storing the program code comprising:
receive a request to process a to-be-processed request;
identify one or more nodes from a plurality of nodes, included in a cluster, to process the to-be-processed request;
divide the to-be-processed request into a plurality of sub-requests;
based on a number of the plurality of sub-requests, generate an additional node for processing the plurality of sub-requests;
assign the plurality of sub-requests to the identified one or more nodes and the generated additional node;
identify a node failure of one of the one or more identified nodes; and re-assign one or more of the plurality of sub-requests assigned to the failed node to another node of the plurality of nodes.

16. The computer system according to claim 15, further comprising:
compare a cumulative load of one of the plurality of nodes with a cumulative load of another of the plurality of nodes.

17. The computer system according to claim 15, further comprising:
compare an average delay in request processing of one of the plurality of nodes with an average delay in request processing of another of the plurality of nodes.

18. The computer system according to claim 15, further comprising:
create an instance of a node template stored in an Infrastructure as a Service (IaaS) framework.

19. The computer system according to claim 15, further comprising:
receive a request to decrease a size of the cluster;
based on the received request, identify at least one node to be removed from the cluster; and
remove an instance of the identified at least one node to decrease the size of the cluster.

20. The computer system according to claim 15, further comprising:
receive a request to generate a replacement node corresponding to the failed node; and
based on the received request, generate a replacement node.

* * * * *